R. H. ROBBINS.
LAMP SHIFTING DEVICE FOR AUTOMOBILES.
APPLICATION FILED APR. 28, 1913.
1,118,234.  Patented Nov. 24, 1914.
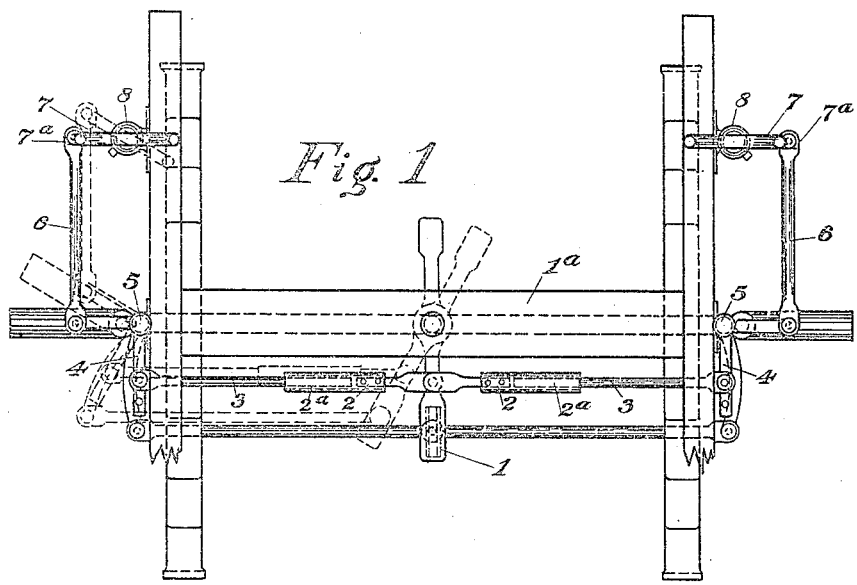
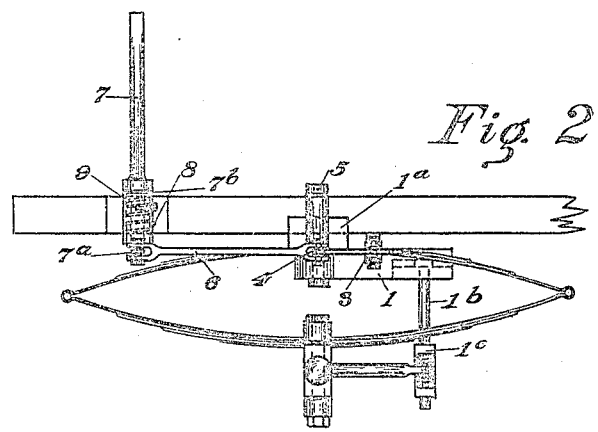
WITNESS
Minnie Korte
Elmer E. Rodalaugh
INVENTOR
RUFUS H. ROBBINS
BY A. B. Bowman
ATTORNEY

UNITED STATES PATENT OFFICE.

RUFUS H. ROBBINS, OF SAN DIEGO, CALIFORNIA.

LAMP-SHIFTING DEVICE FOR AUTOMOBILES.

1,118,234.  Specification of Letters Patent.  Patented Nov. 24, 1914.

Application filed April 28, 1913. Serial No. 764,023.

*To all whom it may concern:*

Be it known that I, RUFUS H. ROBBINS, a citizen of the United States, and a resident of San Diego, in the county of San Diego and State of California, have invented certain new and useful Improvements in Lamp-Shifting Devices for Automobiles, of which the following is a specification.

My invention relates to devices to be used in connection with the steering gears of self propelled vehicles for shifting one of the front lamps thereof, and more particularly adapted for automobiles, for shifting said lamps simultaneously with the shifting or turning of the front wheels of said automobile, leaving one of the lamps straight with the frame of the machine, and the objects of my invention are, first, to provide a device to be used in connection with the steering gear of the automobile for shifting one of the lamps so as to throw the light in the direction the automobile is to travel, and leave one of them straight with the frame of the machine; second, to provide such a device that is simple, durable and easily adapted to different makes of machines, and third, to provide such a device in which there is a slight clearance so that the lamps will not be shifted with only slight turns or the wabble of the front wheels of the vehicle.

With these and other objects in view, as will hereinafter appear, my invention consists of certain novel features of construction, combination and arrangement of parts as will be hereinafter described in detail and particularly set forth in the appended claims, reference being had to the accompanying drawings and to the characters of reference thereon which form a part of this specification, in which:

Figure 1 is a plan view of the front portion of an automobile gear showing my device mounted thereon in operative connection with the steering gear and showing by dotted lines on one side the shifted positions of the axle, and lamp, and Fig. 2 is a side elevational view of said front portion.

Similar characters of reference refer to similar parts throughout the several views.

The connecting arm 1, inner shifting rods 2, outer shifting rods 3, bell cranks 4, bearings 5, lamp connecting rods 6, lamp supports 7, lamp bearings 8 and springs 9, constitute the principal parts of my lamp shifting mechanism.

The shifting arm 1 is pivotally mounted centrally over the front axle on the frame of the vehicle, or if there is no place upon which it may be mounted, there is provided an extra cross-piece $1^a$ on the frame of the machine as shown best in Fig. 1. The ends of this arm extend on each side of this pivotal mounting so as to allow a connection either in front or behind the axle of the vehicle. In this instance it is shown behind. To the one end is slidably connected a pin $1^b$ which is telescopically mounted in a socket $1^c$ which is rigidly mounted on the shifting bar of the vehicle. This telescopic mounting is for the purpose of allowing the pin $1^b$ to reciprocate in the socket $1^c$ with the up and down movement of the front portion of the automobile relatively to the shifting bar caused by the action of the springs. Mounted on this arm between this pivotal mounting and the pin $1^b$ are the inner shifting bars 2 which are provided with sockets $2^a$ on their outer ends in which are reciprocally mounted the outer shifting bars 3. These bars are adapted to reciprocate in the sockets $2^a$, and there is a slight clearance left between the end of the piece 3 and the bottom of the socket $2^a$ to allow slight play so the lamps will not wabble with the slight wabble of the machine when running. These outer shifting bars 3 are pivotally mounted on bell cranks 4 pivotally mounted on opposite sides of the frame on bearings 5. To the other arms of the bell cranks 4 are pivotally connected lamp shifting rods 6, the other ends of which extend forward and connect with arms $7^a$ on the lamp supports 7. These lamp supports 7 are bifurcated pieces adapted to fit the sockets on each side of the lamp and are of the ordinary form. On the lower portion are centrally mounted spindles $7^b$ which are pivotally mounted in the bearings 8. Between the inner surface of these pivotal bearings 8 and the spindle $7^b$ is mounted a torsional spring 9 which is attached to the spindle and bearing and tends to hold the lamp supports straight with the frame of the machine as shown by solid lines in the drawings.

Though I have shown and described a particular construction, combination and arrangement of parts, I do not wish to be limited to this particular construction, combination and arrangement, but desire to include in the purview of my invention the construction, combination and arrangement substantially as set forth in the appended claims. It is obvious that with this construction there is provided a device which, by reason of the telescopic action of the shifting bars, will cause one of the lamps to be moved simultaneously with the shifting of the wheels so that the light will be thrust in the direction the wheels are turned, and the other lamp will remain straight; that the telescopic action between the socket on the shifting bar on the machine allows a free action of the front portion of the frame relatively to the shifting bar; that the torsional springs in the lamp supports tend to hold them straight with the frame at all times and are only moved by the action of the operator in shifting the machine, and then only one at a time, thus allowing one lamp to be straight with the frame and the other turned in the direction in which the machine is turning; that the construction is simple, economical, durable, easily adapted to different makes of machines; and that the arm connection extending in front and behind its support allows for a connection with a shifting bar either in front or behind the axle.

Having thus described my invention, what I claim as new and desire to secure by Letters Patent, is:

1. A lamp shifting device for automobiles comprising lamp supports pivotally mounted on the frame of the vehicle, springs mounted on said lamp supports tending to hold them in a certain position, bell cranks pivotally mounted on the frame of the machine, connecting bars connecting said lamp supports with said bell cranks, an arm pivotally mounted centrally over the front axle of the machine, two-pieced telescopic bars connecting the other members of said bell cranks with said arm, and means connecting the extended end of said arm with the shifting bar of the machine.

2. In a lamp shifting device for automobiles the combination with the steering rod of said automobile, of a socket mounted centrally thereon, a vertical pin reciprocally mounted therein, a lever pivoted centrally over the front axle of the vehicle on which said pin in slidably mounted, oppositely disposed telescopic members pivotally mounted on said lever, bell cranks on opposite sides of the frame of said vehicle pivotally connected to the outer ends of said telescopic members, lamp supports pivotally mounted on the frame of the vehicle, and connecting rods connecting the other members of said bell cranks with said lamp supports.

3. In a lamp shifting device for automobiles, the combination with the steering rod of said automobile, of a socket mounted centrally thereon, a vertical pin reciprocally mounted therein, a lever pivoted centrally over the front axle of the vehicle on which said pin is slidably mounted, oppositely disposed telescopic members pivotally mounted on said lever, bell cranks on opposite sides of the frame of the vehicle pivotally connected to the outer ends of said telescopic members, lamp supports pivotally mounted on the frame of the vehicle, connecting rods connecting the other members of said bell cranks with said lamp supports, springs in connection with said lamp supports tending to hold them straight with the frame of the vehicle.

4. In a lamp shifting device for automobiles, the combination of lamp supports or brackets pivotally mounted on the front frame of the vehicle, a lever pivotally mounted centrally over the front axle of the vehicle, bell cranks mounted on the frame of the vehicle, telescopic bars connecting said lever with one member of each of said bell cranks, connecting rods connecting the other members of the bell cranks with said lamp supports, and means connecting said centrally mounted lever with the steering rod of the vehicle.

In testimony whereof, I have hereunto subscribed by name in the presence of two subscribing witnesses.

RUFUS H. ROBBINS.

Witnesses:
ABRAM B. BOWMAN,
ELMER E. RODABAUGH.